United States Patent
Niu et al.

(10) Patent No.: US 8,663,445 B2
(45) Date of Patent: Mar. 4, 2014

(54) ELECTROCHEMICAL DESALINATION SYSTEM AND METHOD

(75) Inventors: Ran Niu, Shanghai (CN); Hai Yang, Shanghai (CN); John H. Barber, Guelph (CA); Min Hu, Shanghai (CN); Rihua Xiong, Shanghai (CN); Wei Cai, Shanghai (CN); Xin Gao, Shanghai (CN); Yufeng Liu, Shanghai (CN)

(73) Assignee: General Electric Company, Niskayuna, NY (US)

( * ) Notice: Subject to any disclaimer, the term of this patent is extended or adjusted under 35 U.S.C. 154(b) by 550 days.

(21) Appl. No.: 12/570,227

(22) Filed: Sep. 30, 2009

(65) Prior Publication Data

US 2011/0073487 A1     Mar. 31, 2011

(51) Int. Cl.
*B01D 57/00* (2006.01)

(52) U.S. Cl.
USPC .......................................... 204/663; 204/666

(58) Field of Classification Search
USPC ..................... 204/267, 663, 666; 210/748.01; 361/434
See application file for complete search history.

(56) References Cited

U.S. PATENT DOCUMENTS

| | | | |
|---|---|---|---|
| 3,354,068 A | 11/1967 | Rightmire et al. | |
| 5,425,858 A | 6/1995 | Farmer | |
| 7,138,042 B2 | 11/2006 | Tran et al. | |
| 8,038,867 B2 | 10/2011 | Du et al. | |
| 2002/0167782 A1 | 11/2002 | Andelman et al. | |
| 2004/0188246 A1* | 9/2004 | Tran et al. | 204/267 |
| 2008/0105551 A1 | 5/2008 | Wang et al. | |
| 2009/0045048 A1* | 2/2009 | Bourcier et al. | 204/228.1 |
| 2010/0044244 A1* | 2/2010 | Lee et al. | 205/687 |

FOREIGN PATENT DOCUMENTS

| | | |
|---|---|---|
| CN | 101331088 A | 12/2008 |
| CN | 101468836 A | 7/2009 |
| CN | 101481159 A | 7/2009 |
| EP | 1348670 A1 | 10/2003 |
| RU | 2245848 C2 | 2/2005 |
| WO | 0189656 A1 | 11/2001 |
| WO | 2005001164 A1 | 1/2005 |
| WO | WO 2006050079 A2 * | 5/2006 |

OTHER PUBLICATIONS

European Search Report dated Oct. 15, 2010.

* cited by examiner

*Primary Examiner* — Keith Hendricks
*Assistant Examiner* — Steven A. Friday
(74) *Attorney, Agent, or Firm* — Mary Louise Stanford

(57) ABSTRACT

An electrochemical desalination system includes a first and a second electrochemical device and a controller. The first and second electrochemical devices each comprises a electrochemical desalination module comprising at least one pair of electrodes and a compartment between each pair of electrodes for receiving an electrolyte solution. Each of the first and second electrochemical desalination devices comprises a plurality of successive operation cycles. Each cycle comprises a charging mode of operation for charging each pair of electrodes and for adsorbing ions in the electrolyte solution on the electrodes, and a discharging mode of operation for discharging the pair of electrodes and for desorbing ions from the pair of electrodes. The controller is configured to control the system that the first and second electrochemical desalination devices have interleaved charging and discharging modes of operation. One of the first and second electrochemical desalination devices is in a discharging mode and the at least one pair of electrodes release electrical current, while the other of the first and second electrochemical desalination devices is in a charging mode of operation and receives the electrical current released from said one of the first and second electrochemical desalination device.

11 Claims, 7 Drawing Sheets

ELECTROCHEMICAL DESALINATION SYSTEM AND METHOD

BACKGROUND

1. Technical Field

Embodiments of the invention relate to the field of desalination technology, and more particularly to an electrochemical desalination system and a method of controlling the system.

2. Discussion of Related Art

One type of electrochemical desalination system utilizes at least a pair of electrodes within an electrolyte solution. The electrochemical desalination system comprises a plurality of successive operation cycles, and each operation cycle comprises a charging mode of operation and a discharging mode of operation. In the charging mode of operation of the electrochemical desalination system, the pair of electrodes is oppositely charged by an external power supply to form an electric field between the pair of electrodes. Ions in the electrolyte solution are driven by the electric field toward the oppositely charged electrodes and adsorbed on surfaces of the electrodes. Accordingly, the pair of electrodes forms a capacitor which stores electric energy during the charging mode of operation. During the charging mode of operations, the concentration of the ions in the electrolyte solution reduces over time, and accordingly the electrolyte solution exiting from the electrochemical desalination system is a dilute water with reduced ions as compared to the electrolyte solution fed into the electrochemical desalination system. During the discharging mode of operation, the electric energy stored in the capacitor (electrodes) is released, and ions desorb from the surfaces of the pair of electrodes into the electrolyte solution. Accordingly, the electrolyte solution exiting from the electrochemical desalination system during the discharging mode of operation is a concentrated water with a higher concentration of ions as compared to the feed solution. Such an electrochemical desalination device is also referred to as a "supercapacitor desalination (SCD) system."

Conventional methods of discharging the pair of electrodes during the discharging mode of operations comprise forming a short circuit between the pair of electrodes, or connecting the pair of electrodes with a utility to consume the electric current released by the pair of electrodes, or reversing polarities of the pair of electrodes to release the electrical energy stored in the pair of electrodes. None of the conventional methods makes direct use of the electric energy released during the discharging mode of operation in the SCD system itself. Accordingly, it may be desirable to have an SCD system that differs from those systems or systems that are currently available and make direct use of the electrical energy released during the discharging process. It may be desirable to have a method for controlling operation of the SCD system which differs from those are currently available.

BRIEF DESCRIPTION

In accordance with one embodiment, an electrochemical system is provided. The electrochemical desalination system includes a first and a second electrochemical device and a controller. The first and second electrochemical devices each comprises a electrochemical desalination module comprising at least one pair of electrodes and a compartment between each pair of electrodes for receiving an electrolyte solution. Each of the first and second electrochemical desalination devices comprises a plurality of successive operation cycles. Each cycle comprises a charging mode of operation for charging each pair of electrodes and for adsorbing ions in the electrolyte solution on the electrodes, and a discharging mode of operation for discharging the pair of electrodes and for desorbing ions from the pair of electrodes. The controller is configured to control the system that the first and second electrochemical desalination devices have interleaved charging and discharging modes of operation. One of the first and second electrochemical desalination devices is in a discharging mode and the at least one pair of electrodes release electrical current, while the other of the first and second electrochemical desalination devices is in a charging mode of operation and receives the electrical current released from said one of the first and second electrochemical desalination device.

In accordance with one embodiment, an electrochemical desalination method is provided. The method comprises operating a first electrochemical desalination device in a charging mode of operation. The charging mode of operation comprises charging at least one pair of electrodes of the first electrochemical desalination device with opposite polarities; passing an electrolyte solution through a compartment between each pair of electrodes of the first electrochemical desalination device; adsorbing ions in the electrolyte solution on the at least one pair of electrodes; and exiting a dilute solution out of the first electrochemical desalination device. The electrochemical desalination method comprises operating the first electrochemical desalination device in a discharging mode of operation comprising releasing electric energy stored in the at least one pair of electrodes of the first electrochemical desalination device to a second electrochemical desalination device, and charging at least one pair of electrodes of the second electrochemical desalination device using the electric energy released by the at least one pair of electrodes of the first electrochemical desalination device; and desorbing ions accumulated on the at least one pair of electrodes of the first electrochemical desalination device into the electrolyte solution in the compartment.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1:
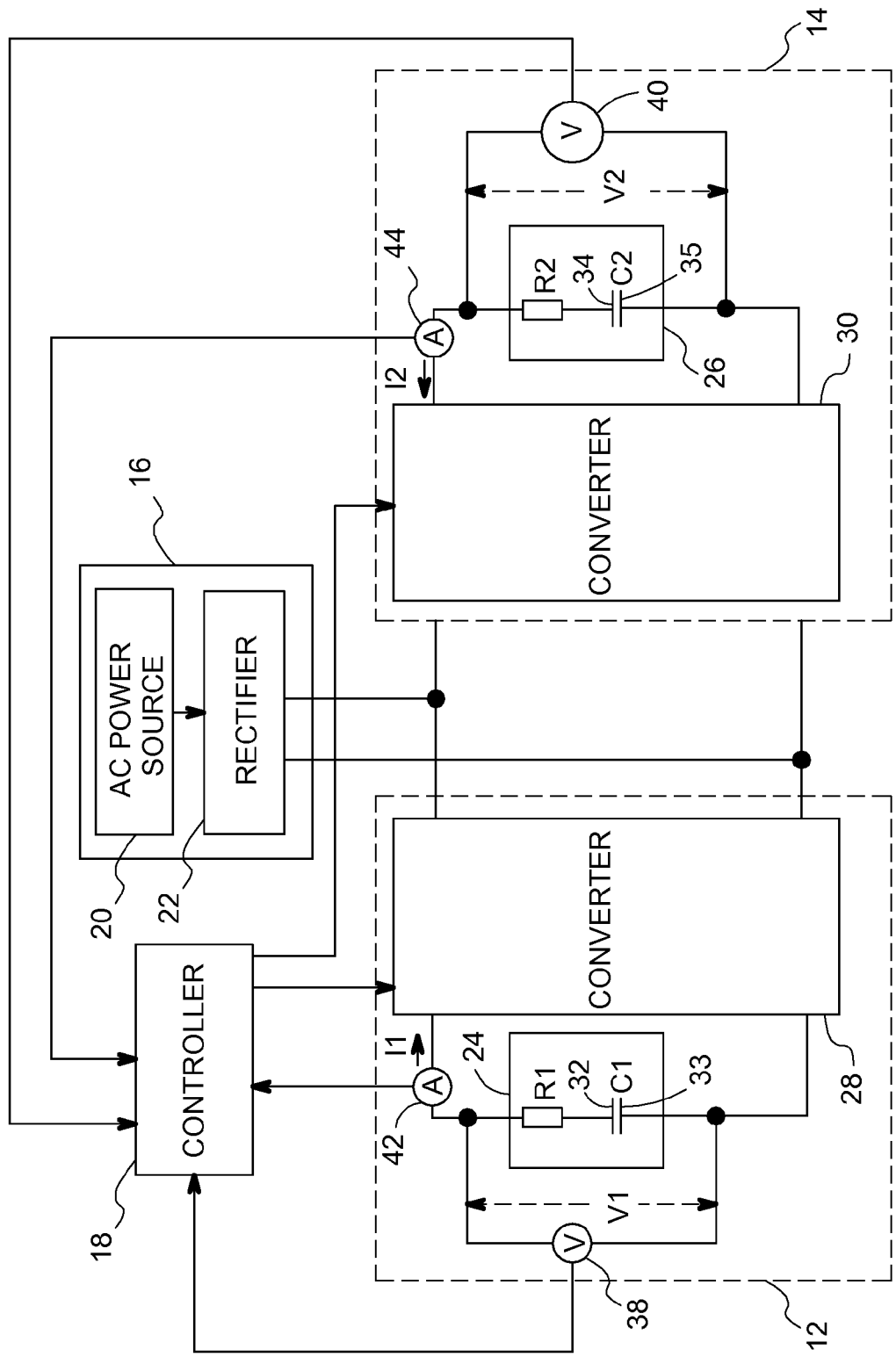
FIG. 1 is an exemplary schematic diagram of an electrochemical desalination system comprising a first and a second electrochemical desalination device according to one embodiment of the invention.

Embodiments of the invention relate to an electrochemical desalination system. The electrochemical desalination system comprises a first and a second electrochemical desalination device and a controller. The first and second electrochemical desalination devices each comprise a pair of electrodes and a compartment between the pair of electrodes for receiving an electrolyte solution. The first and second electrochemical desalination devices each comprise a plurality of successive operation cycles, and each cycle comprises a charging mode of operation for charging the pair of electrodes and adsorbing ions in the electrolyte solution on surfaces of the electrodes, and a discharging mode of operation for releasing electric energy stored on the pair of electrodes and desorbing ions that accumulated on the electrodes into the electrolyte solution. The controller is configured to control the electrochemical desalination system such that when one of the first and second electrochemical desalination devices is in a discharging mode of operation and the pair of electrodes release electrical energy, the other of the first and second electrochemical desalination devices is in a charging mode of operation and the pair of electrodes receiving the electrical energy released from said one of the first and second electrochemical desalination devices. Accordingly, electric energy released by the discharging mode of operation of one electrochemical desalination device is utilized by another electrochemical desalination device, and energy efficiency of the electrochemical desalination system is improved. "Energy efficiency" of the electrochemical desalination system refers to a ratio of energy used for ion removal to the total energy provided by a power supply to the electrochemical desalination system. The electrochemical desalination system is also referred to as a "supercapacitor desalination system," and the electrochemical desalination device is also referred to as a "supercapacitor desalination device" hereinafter.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items.

"Supercapacitor" is an electrochemical capacitor that has a relatively higher energy density when compared to a common capacitor. As used herein, "supercapacitor" is inclusive of other high performance capacitors, such as ultracapacitors. A capacitor is an electrical device that can store energy in the electric field between a pair of closely spaced conductors (called 'electrodes'). When voltage is applied to the capacitor, electric charges of equal magnitude, but opposite polarity, build up on each electrode.

Referring to FIG. 1, an electrochemical desalination system such as a supercapacitor desalination (SCD) system 10 comprises a first SCD device 12, a second SCD device 14, at least one power supply 16, and a controller 18 controlling operation of the first and second SCD devices 12, 14.

In the illustrated embodiment of FIG. 1, the first and second SCD devices 12, 14 are electrically coupled to one common power supply 16. In other embodiments, the SCD system 10 may comprise more than one power supply. For example, the SCD system 10 comprises a first and a second power supply (not shown) respectively coupled to the first and second SCD devices 12, 14. In the illustrated embodiment, the power supply 16 comprises an AC power source 20 providing an alternating current, and a rectifier 22 for converting the alternating current into a direct current to apply to the first and second SCD devices 12, 14. In other embodiments, the power supply 16 may be a DC power supply which provides a direct current or a DC voltage to the first and second SCD devices 12, 14 without using the rectifier. In the illustrated embodiment, the first and second SCD devices 12, 14 may be electrically coupled to one common rectifier 22 via a shunt for example. In other embodiments, the power supply 16 may comprise a first and a second rectifier operable for respectively coupling to the first and second SCD devices 12, 14.

Figure 8:
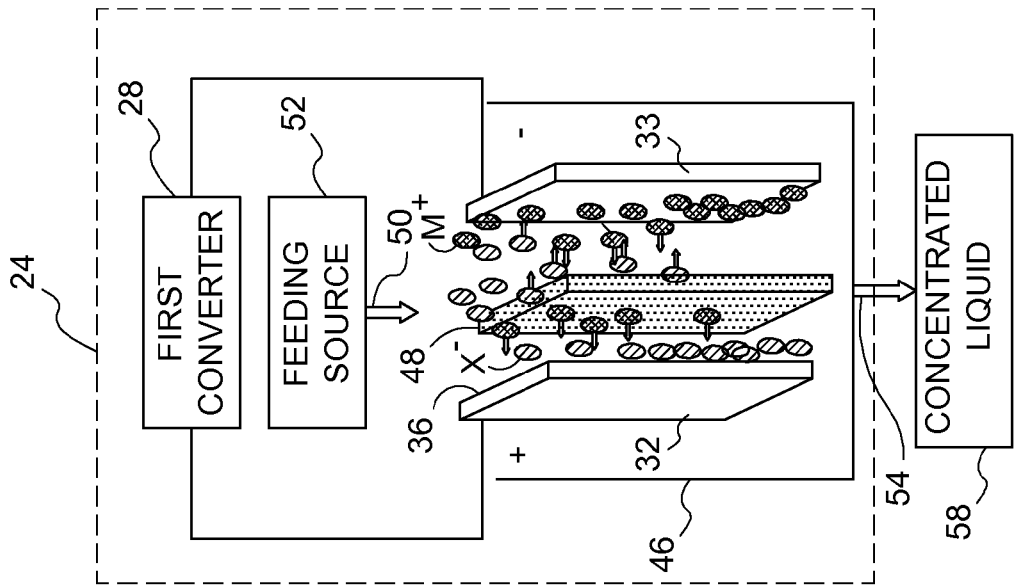
FIGS. 7 and 8 illustrate an exemplary electrochemical desalination unit of the first electrochemical desalination device of FIG. 1, respectively during a charging mode of operation and a discharging mode of operation, according to one embodiment of the invention.
Figure 7:
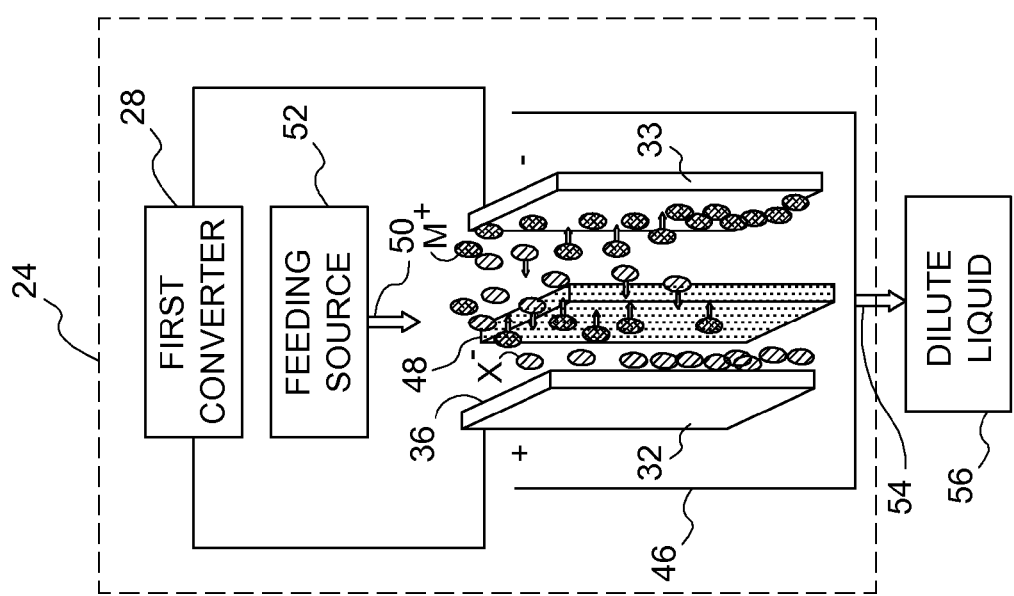

In the illustrated embodiment of FIG. 1, the first SCD device 12 comprises at least one SCD module 24 (first SCD module 24) and a first converter 28 between the first SCD modules 24 and the power supply 16. In certain embodiments, the first SCD module 24 comprises at least one pair of electrodes 32, 33 and a compartment 36 (FIGS. 7 and 8) between the pair of electrodes 32, 33 for receiving an electrolyte solution (FIGS. 7 and 8). Likewise, in the illustrated embodiment, the second SCD device 14 comprises at least one SCD module 26 (second SCD module 26) and a second converter 30 between the second SCD modules 26 and the power supply 16, and the second SCD module 26 comprises at least one pair of electrodes 34, 35 and a compartment 36 between the pair of electrodes 34, 35 for receiving an electrolyte solution. In the illustrated embodiment, the first and second SCD units 24, 26 respectively comprises an internal resistance R1 and R2. In one embodiment, the first and second converters 28, 30 are each a bi-directional DC/DC converter. In an alternative embodiment, the first and second SCD unit 24, 26 comprise one common bi-directional converter.

In the illustrated embodiment of FIG. 1, the first SCD device 12 comprises a first voltage sensor 38 for measurement of the voltage (V1) across the first SCD unit 24, and a first current sensor 42 for measurement of a charging/discharging current (I1) applied to or released from the pair of electrodes 32, 33. The second SCD device 14 comprises a second voltage sensor 40 for measurement of the voltage (V2) across the second SCD unit 26, and a second current sensor 44 for measurement of a charging/discharging current (I2) applied to or released by the pair of electrodes 34, 35. The measured voltages (V1, V2) and currents (I1, I2) are transmitted to the controller 18, and the controller 18 uses these signals for controlling the first and second SCD devices 12, 14.

In certain embodiments, the first and second SCD devices 12, 14 each comprise a plurality of successive operation cycles. Each cycle comprises a charging mode of operation for charging the pair of electrodes 32, 33 (34, 35) and adsorbing ions in the electrolyte solution on surfaces of the electrodes 32, 33 (34, 35), and a discharging mode of operation for releasing electric energy stored on the pair of electrodes 32, 33 (34, 35) and desorbing ions that are accumulated on the pair of electrodes 32, 33 (34, 35) into the electrolyte solution.

In certain embodiments, the controller 18 is configured to control the first and second SCD devices 12, 14 such that they have interleaved charging and discharging modes of operation. When one of the first and second SCD devices 12, 14 is in a discharging mode of operation and the pair of electrodes 32, 33 or 34, 35 release electrical current, the other of the first and second SCD devices 12, 14 is in a charging mode of operation and the pair of electrodes 34, 35 or 32, 33 receive the electrical current released from said one of the first and second SCD devices 12, 14. For example, when the first SCD device 12 is in a discharging mode of operation, the pair of electrodes 32, 33 of the first SCD device 12 release electrical current, while the second SCD device 14 is in a charging mode of operation and the pair of electrode 34, 35 of the second SCD device 14 receive the electrical current released from the pair of electrodes 32, 33 of the first SCD device 12. When the second SCD device 14 turns to a discharging mode of operation, the pair of electrodes 34, 35 of the second SCD device 14 release electrical current, while the first SCD device 12 is in a charging mode of operation and the pair of electrode 32, 33 of the first SCD device 12 receive the electrical current released from the pair of electrodes 34, 35 of the second SCD device 12. Accordingly, electric energy released by the discharging mode of operation of one SCD device is utilized by another SCD device, and energy efficiency of the SCD system 10 is improved.

In certain embodiments, the controller 18 is configured to calculate and store charging current profiles (not shown) and charging time (t1) for the first and second SCD devices 12, 14, according to the electric charge (Q) needed for charging the pairs of electrodes 32, 33 and 34, 35. In one embodiment, the charging current is a constant DC current. In one embodiment, the first and second converters 28, 30 are operated to output charging currents to the first and second SCD devices 12, 14 according to the charging current profiles. In the illustrated embodiment, electrical current released by the pair of electrodes 32, 33 of the first SCD device 12, in a discharging mode of operation, is transmitted through the first converter 28 to the second SCD device 14, and is further converted by the second converter 30 into a charging DC current for charging the pair of electrodes 34, 35 of the second SCD unit 28. Likewise, electrical current released by the pair of electrodes 34, 35 of the second SCD device 14 transmitted through the second converter 30 to the first SCD device 12, and is further converted by the first converter 28 into a charging DC current for charging the pair of electrodes 32, 33 of the first SCD device 12.

Figure 2:
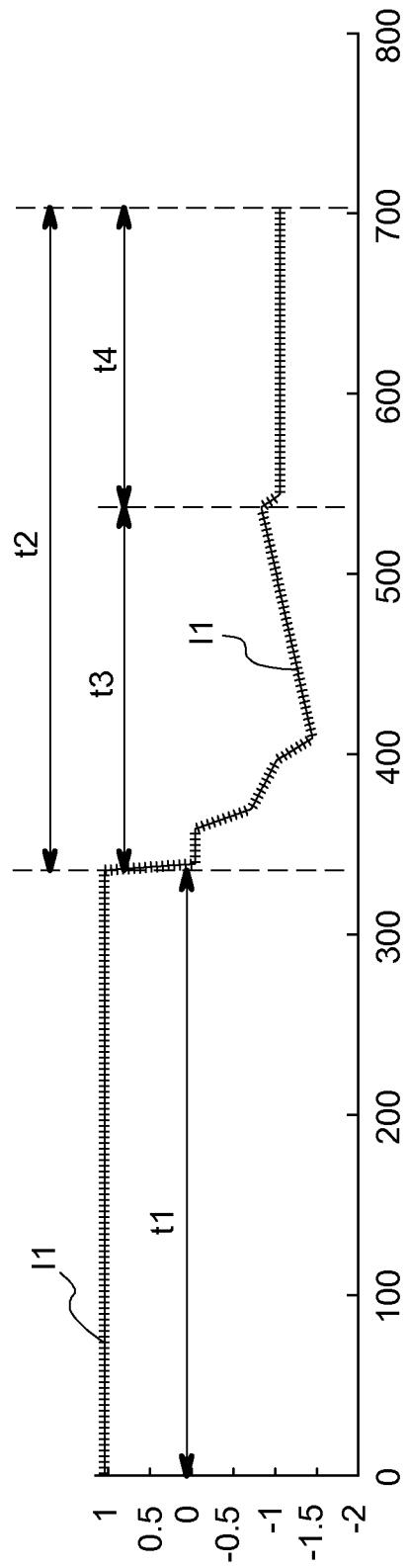
FIG. 2 illustrates an exemplary charging and discharging current diagram for the first electrochemical desalination device of FIG. 1 within one operation cycle.
Figure 3:
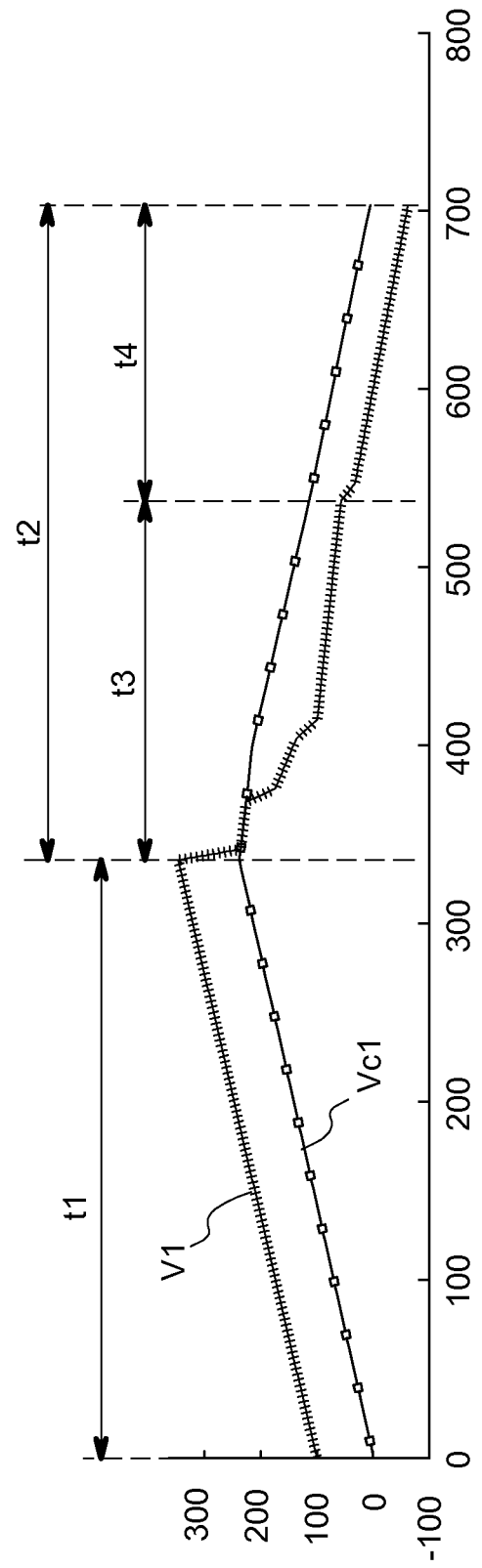
FIG. 3 illustrates an exemplary charging and discharging voltage diagram for the first electrochemical desalination device of FIG. 1 within the operation cycle.
Figure 4:
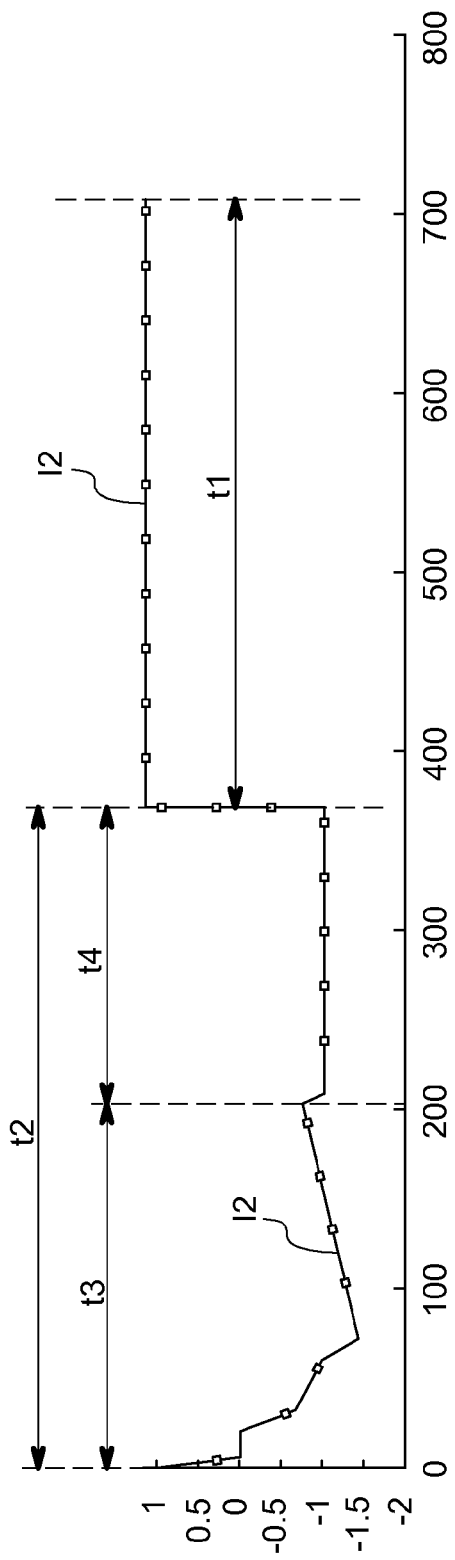
FIG. 4 illustrates an exemplary charging and discharging current diagram for the second electrochemical desalination device of FIG. 1 within one operation cycle.
Figure 5:
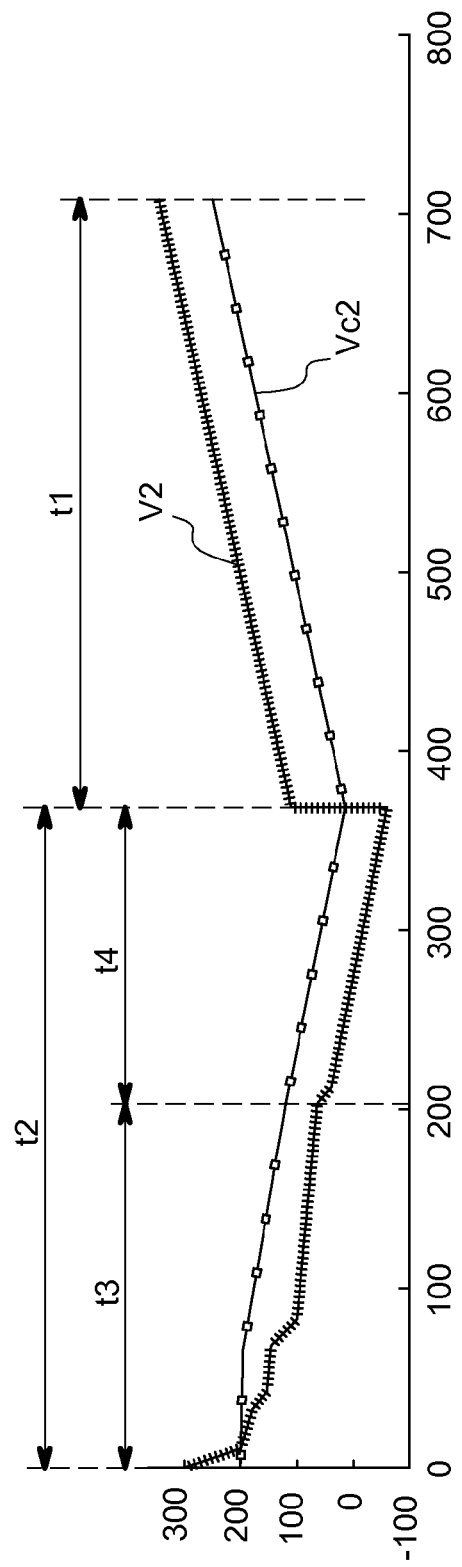
FIG. 5 illustrates an exemplary charging and discharging voltage diagram for the second electrochemical desalination device of FIG. 1 within the operation cycle.

In one embodiment, the first and second SCD devices 12, 14 have an equal cycle time (T). FIGS. 2 and 3 respectively illustrate an exemplary charging/discharging current curve and voltage curve of the first SCD unit 24 as measured by the first current sensor 42 and first voltage sensor 38, within one operation cycle. Voltage curves V1 and Vc1 in FIG. 3 respectively represent the voltage across the first SCD unit 24 and a voltage across the pair of electrodes 32, 33. FIGS. 4 and 5 respectively illustrate a discharging/charging current curve and a voltage curve on the second SCD unit 28 of the second SCD device 14, as measured by the second current sensor 44 and second voltage sensor 40, within the same operation cycle and within the same time period as FIGS. 2 and 3. Voltage curves V2 and Vc2 in FIG. 5 respectively represent the voltage across the second SCD unit 26 and a voltage across the pair of electrodes 34, 35. In the illustrated embodiment, the operation cycles of the first and second SCD devices 12, 14 each have a charging mode of operation with the charging time (t1) and a discharging mode of operation with a discharging time (t2), i.e. T=t1+t2. In one embodiment, the charging time (t1) is equal to the discharging time (t2).

Referring to FIGS. 2 and 3, during the charging mode of operation within the charging time (t1), the first converter 28 is operable to provide a charging current (I1) to the first SCD unit 24. In the illustrated embodiment, the charging current (I1) during the charging time (t1) is a constant DC current. In other embodiments, the charging current (I1) during the charging time (t1) may be variable with time. As is shown in FIG. 3, the charging voltage (V1) cross the first SCD unit 24 and the voltage (Vc1) across the pair of electrodes 32, 33 during the charging time (t1) increase gradually. During the discharging mode of operation within the discharging time (t2), the pair of electrodes 32, 33 release a discharging current (I1) through the first converter 28. The discharging current (I1) during the discharging mode of operation is in reversed direction as compared to the charging current (I1) in the charging mode of operation. In the illustrated embodiment of FIG. 3, the discharging voltage (V1) cross the first SCD unit 24 and the voltage (Vc1) across the pair of electrodes 32, 33 during the discharging time (t2) decrease.

In the illustrated embodiment of FIGS. 2 and 3, the discharging mode of operation comprises a normal discharging mode of operation for a normal discharging time (t3). During the normal discharging time (t3), the pair of electrodes 32, 33 release a discharging current (I1) driven by the electric energy stored therein through the first converter 28, the voltage (V1) across the first SCD unit 24 and the voltage (Vc1) across the pair of electrodes 32, 33 decrease. However, at the end of the normal discharging mode of operation, the electric energy is not completely released because of the voltage across the internal resistance (R1) which is disadvantageous for improving the energy efficiency of the SCD system 10.

In the illustrated embodiment of FIGS. 2 and 3, the discharging modes of operation of the first and second SCD devices 12, 14 further comprise a compulsory discharging mode of operation for a compulsory discharging time (t4). During the compulsory discharging mode of operation, the power supply 16 provides a compulsory discharging current (I1) to the pair of electrodes 32, 34 but with reversed polarities as compared to charging current (I1) in the charging mode of operation. The controller 18 is configured to control the system such that at the end of the compulsory discharging mode of operation, he voltage (Vc1) across the pair of electrodes 32, 33 is substantially equal to zero, the voltage (V1) across the first SCD unit 24 is below zero. Accordingly, electric charges stored in the first SCD unit 24 are completely released.

In certain embodiments, the second SCD device 14 has the same operation cycles as the first SCD device 12. When the first SCD device 12 is in a charging mode of operation within the charging time (t1), the second SCD device 14 is in a discharging mode of operation and releasing electric current for charging the first SCD device 12. When the first SCD device 12 is in a discharging mode of operation during the discharging time (t2) and releases electric current, the second SCD device 14 is in a charging mode of operation and is charged by the electric current released by the first SCD device 12 and the power supply 16.

In certain embodiments, during the charging mode of operation of the first SCD device in the charging time (t1), the first converter 28 is operable to transmit the charging current (I1) according to the current profile manipulated by the controller 18. The controller 18 is configured to control the system such that when a normal discharging current (I2) released by the second SCD device 14 can meet the energy requirement for generating the charging current (I1), the first converter 28 only receives the normal discharging current (I2) for generating the charging current (I1) without receiving electric current from the power supply 16. When the normal discharging current (I2) released by the second SCD device 14 can not meet the energy requirement for generating the charging current (I1), the first converter 28 is operable to receive energy driven by both the normal discharging current (I2) and an electric current from the power supply 16.

Figure 6:
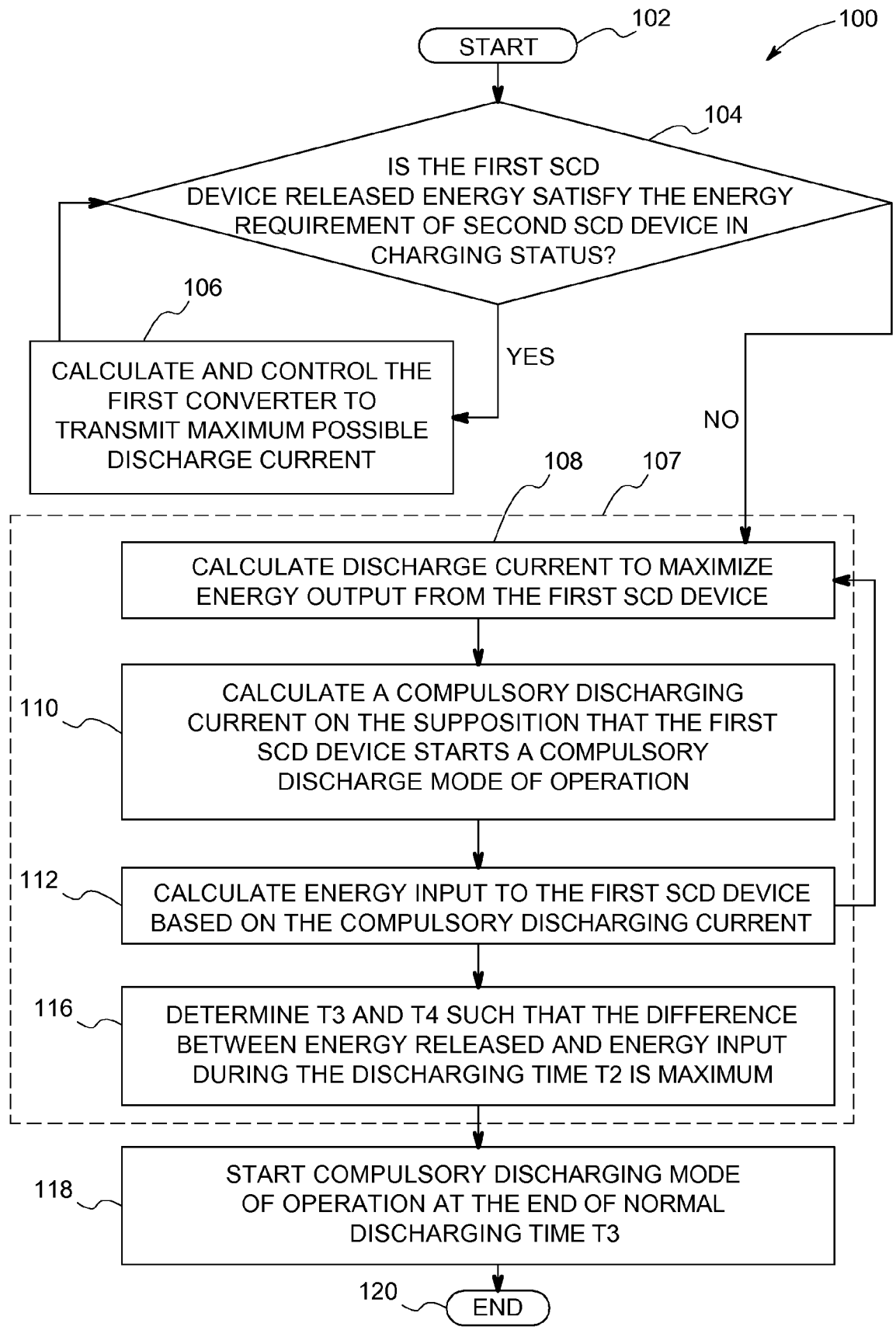
FIG. 6 is an exemplary process map of a method during a discharging mode of operation of the first electrochemical desalination device.

In certain embodiments, charging and discharging processes of the first and second SCD devices 12, 14 performed by the controller 18 are similar but interleaved in time. An exemplary process 100 performed by the controller 18 for discharging the first SCD device 12 is illustrated in FIG. 6. The illustrated process 100 starts at step 102, with the controller 18 operating such that the pair of electrodes 32, 33 of the first SCD device 12 begin a normal discharging mode of operation and release a normal discharging current (I1) through the first converter 28. Electrical energy of the normal discharging current (I1) is further converted into a charging current (I2) for charging the pair of electrodes 34, 35 of the second SCD device 14.

In certain embodiments, at step 104, the controller 18 determines if the electric energy released by the pair of electrodes 32, 33 of the first SCD device 12 will meet the energy requirement for charging the pair of electrodes 34, 35 of the second SCD device 14. In one embodiment, the controller 18 compares an instant electric power (P1) released from the first SCD device 12, according to:

$$P1 = V1 \times I1,$$

with an instant electric power (P2) received by the second SCD device 14 according to:

$$P2 = V2 \times I2.$$

If P1≥P2, it is determined the electric energy released by the first SCD device 12 can meet the energy requirement of the second SCD device 14, the process 100 proceed with step 106.

At step 106, in certain embodiments, the controller 18 calculates and controls the first converter 28 to transmit a maximum possible discharge current to the second SCD device 14, and then returns back to step 104 until the electric energy released by the first SCD device 12 can not meet the energy requirement of the second SCD device 14, (i.e. P1<P2). The process 100 proceeds with step 108, and the second converter 30 of the second SCD device 14 is operable to receive current both from the discharging energy released by the first SCD device 12 and an electric energy from the power supply 16.

At step 107, in certain embodiments, the controller 18 calculates and determines normal discharge current (I1), normal discharging time (t3) and compulsory discharging time (t4). In one embodiment, the controller 18 uses the charging current (I2) and the voltage (V2) of a previous operation cycle of the second SCD device 14 and other information such as internal resistance (R1) and the capacitance (C1) to calculate the normal discharging time (t3) and compulsory discharging time (t4). In other embodiments, the controller 18 may use average values of the current and voltage of a number of cycles for example.

In the illustrated embodiment, the step 107 comprises a step 108 that the controller 18 calculates the discharging current (I1) to maximize an energy output (E1) from the first SCD device 12. In the illustrated embodiment, the step 107 further comprises a step 110, that the controller 18 is configured to calculate the compulsory discharging current (I1) on the supposition that the first SCD device 12 starts the compulsory discharging mode of operation. In one embodiment, the compulsory discharging current (I1) is a constant DC current. In certain embodiments, the compulsory discharging current (I1) is calculated according to the compulsory time (t4), which is the difference of a total discharging time (t2) and the normal discharging time (t3). As the charging time (t1) equals the discharging current time (t2), the compulsory time (t4) is the difference between the charging time (t1) and the normal discharging time (t3). In one embodiment, the controller 18 is configured to calculate the electric charge (Q) remaining in the pair of electrodes 32, 33, and calculates the compulsory current according to $$Q = \int_{t_3}^{t_3+t_4} I_1(t)\,dt.$$

In the illustrated embodiment, the step 107 further comprises a step 112 that the controller 18 calculates an energy input to the first SCD device 12 during the compulsory discharging mode of operation.

In the illustrated embodiment, the controller 18 repeats the calculation of steps 108, 110 and 112 at a determined time interval until end of the discharging time (t2). In one embodiment, the time interval is 5 seconds for example.

In certain embodiments, at step 116, the controller 18 determines the normal discharging time (t3) and compulsory discharging time (t4) such that a difference between energy released and an energy input during the discharging time (t2) is maximized.

In certain embodiments, at step 118, the controller 18 controls the first SCD device 12 to start a compulsory discharging mode of operation at the end of determined normal discharging time (t3), and end at step 120 at end of the determined compulsory discharging time (t4).

FIG. 7 illustrates an exemplary SCD module of the first and second SCD device 12, 14, such as the first SCD module 24 during the charging mode of operation. FIG. 8 illustrates an exemplary first SCD module 24 during the discharging mode of operation. In the illustrated embodiment, the exemplary SCD module 24 comprises a desalination vessel 46 defining a volume, and the at least one pair of electrodes 32, 33 housed in the volume and electrically coupled to the converter 28.

In the illustrated embodiment of FIGS. 7 and 8, the SCD module 24 further comprises an electrically insulating spacer 48 between the pair of electrodes 32, 33. Further, the desalination vessel 46 includes at least one inlet (not labeled) from which a feed electrolyte solution 50 from a feeding source 52 enters the compartment 36, and at least one outlet 54 for exiting of an output liquid from the compartment 46. The electrolyte solution may be guided inside the desalination vessel 46 by using external forces. Suitable external forces may include gravity, suction, and pumping.

In certain embodiments, each of the first and second electrodes 32, 33 includes a conducting material that has a high surface area, and a current collector (not shown) within the conducting material for electrically coupling to the first converter 28. In certain embodiments of the invention, suitable material and characteristics of the electrodes, current collector, and insulating spacer 48 may be of types described and illustrated in commonly assigned U.S. 20080185346, the disclosure of which is incorporated herein by reference.

Referring to FIG. 7, during a charging mode of operation, the pair of electrodes 32, 33 are respectively charged by the first converter 28 as a positive electrode and a negative electrode. The feed electrolyte solution 50 from the feeding source 52 is made to pass the SCD module 24 and between the pair of electrodes 32, 33. Cations ($M^+$) move towards and are adsorbed on the negative electrode 33, and anions ($X^-$) move towards and are adsorbed on the positive electrode 32. As a result of this charge accumulation inside the SCD module 24, the output liquid, which is a dilute liquid 56 coming out of the SCD module 24, has a lower concentration of cations ($M^+$) and anions ($X^-$) as compared to the feed electrolyte solution 50. In one embodiment, the dilute liquid 56 may be again subjected to further de-ionizing by being fed back to the first SCD device 12. In another embodiment, the dilute liquid 56 is output for industrial use for example.

Referring to FIG. 8, during a discharging mode of operation after the charging mode of operation, the adsorbed cations and anions desorbed from the pair of electrodes 32, 33. In certain embodiments, during the discharging mode of operation of the SCD module 24, although the polarities of the pair of electrodes 32, 33 may be maintained the same, but the potential difference between the pair of electrodes 32, 33 may become less, thus allowing the anions and cations to desorb from the electrodes 32, 33. While in other embodiments, during the discharging mode of the SCD module 24, the polarities of the electrodes 32, 33 may be reversed. As a result, the output liquid, which is called concentrated liquid 58, has a higher concentration of cations and anions compared to the feed electrolyte solution 50.

Figure 9:
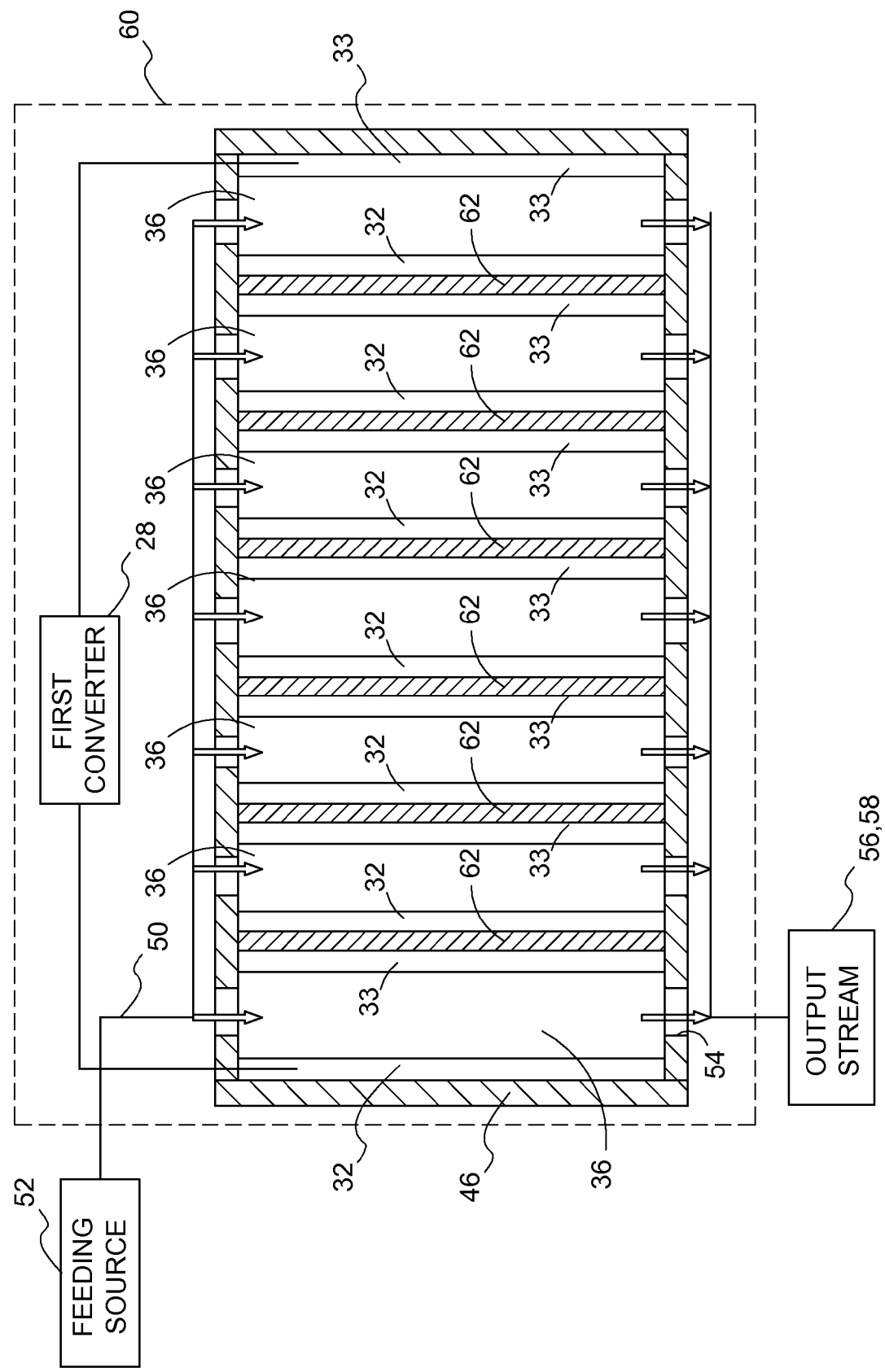
FIG. 9 is a cross-sectional view of the electrochemical desalination unit according to another embodiment of the invention.

Referring to FIG. 9, an SCD module 60 according to another embodiment of the invention comprises a plurality of pairs of electrodes 32, 33 housed in a desalination vessel 46. The plurality of pairs of electrodes 32, 33 are arranged in parallel and are connected from one another by the ion barrier 62. In the illustrated embodiment, the desalination vessel 46 includes a plurality of inlets for simultaneously introducing feed electrolyte solution 50 respectively into corresponding compartment 36 in parallel, and a plurality of outlets 54 for exiting of output liquid which is a dilute liquid 56 during the charging mode of operation and a concentrated liquid 58 at a discharging mode of operation. In an alternative embodiment, which is not shown in the drawings, only one of the inlets introduces a feed electrolyte solution 50 to one of the compartments 36, and the compartments 36 are interconnected in a manner that the outlet 54 of one compartment 36 communicates the inlet of another compartment 36 in series, so that the liquid passes over each compartment 36. In the illustrated embodiment, only one of the outlets 54 is an exit of the output liquid. Accordingly, the concentrated liquid 58 can have a higher concentration of ions. In another embodiment, the SCD module 60 can be configured in any combination way of the above described parallel and series modes.

Figure 10:
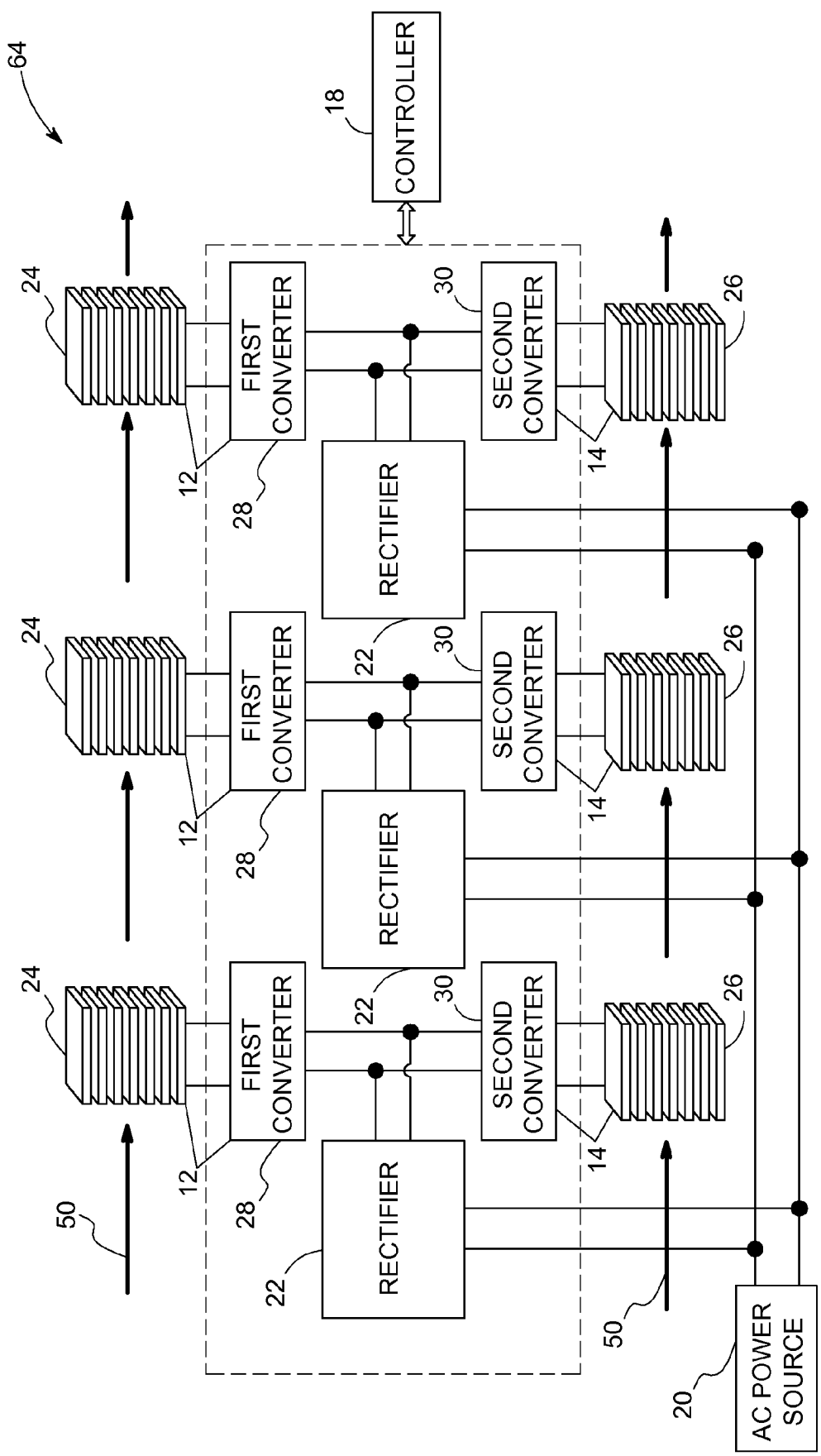
FIG. 10 illustrates an electrochemical desalination system according to another embodiment of the invention.

Referring to FIG. 10, a SCD system 64 according to another embodiment of the invention comprises a plurality of first SCD devices 12 connected in series and a plurality of second SCD devices 14 connected in series for respectively continuous removal of ions for the feeding electrolyte solution 50. The controller 18 is configured to control the system such that each of the first SCD devices 12 has interleaved charging and discharging modes of operation with a corresponding second SCD device 14 (as described with reference to the description of FIGS. 1-6). Accordingly, the discharging current of one SCD device is utilized by another SCD device for charging the SCD units. In other embodiments, one of the first SCD devices 12 may have interleaved charging and discharging modes of operation with two or more of the second SCD devices 14. A discharging current released by the first SCD device 12 is utilized for charging the two or more of the second SCD devices 14.

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An electrochemical desalination system comprising:
a first and a second electrochemical desalination devices each comprising an electrochemical desalination module comprising at least one pair of electrodes and a compartment between each pair of electrodes for receiving an electrolyte solution, each of the first and second electrochemical desalination devices comprising a plurality of successive operation cycles, each cycle comprising a charging mode of operation for charging each pair of electrodes and for adsorbing ions in the electrolyte solution on the electrodes, and a discharging mode of operation for discharging the pair of electrodes and for desorbing ions from the pair of electrodes; and
a controller programmed to control the system such that the first and second electrochemical desalination devices have interleaved charging and discharging modes of operation, wherein one of the first and second electrochemical desalination devices is in a discharging mode and the at least one pair of electrodes release electrical current, while the other of the first and second electrochemical desalination devices is in a charging mode of operation and receives the electrical current released from said one of the first and second electrochemical desalination device,
wherein the controller is programmed to control the system such that the discharging mode of operation of each of the first and second electrochemical desalination devices comprises a normal discharging mode of operation and a compulsory discharging mode of operation,
wherein the controller is further programmed to calculate and determine a normal discharge current, normal discharging time, compulsory discharging current and compulsory discharging time based on a previous operation cycle or the average of several previous operation cycles.

2. The system of claim 1, wherein the controller is programmed to control the system such that each of the first and second electrochemical desalination devices has an equal cycle time.

3. The system of claim 1, wherein the controller is programmed to control the system such that a charging time for the charging mode of operation equals a discharging time for the discharging mode of operation for each of the first and second electrochemical desalination devices.

4. The system of claim 1, wherein the first and second electrochemical desalination devices comprise at least one bi-directional converter electrically connected between the electrochemical desalination module and a power supply.

5. The system of claim 4, wherein each of the bi-directional converters comprises a bi-directional DC/DC converter for transmitting a direct current to the electrochemical desalination module of one of the first and second electrochemical desalination devices during the charging mode of operation, and transmitting a direct current to the other of the first and second electrochemical desalination devices.

6. The system of claim 1, comprising at least two first electrochemical desalination devices connected in series and at least two second electrochemical desalination devices connected in series for respectively continuous removal of ions.

7. The system of claim 1, wherein the controller is programmed to calculate and store charging current profiles and charging time for the first and second electrochemical desalination devices, according to electric charge needed for charging the pairs of electrodes.

8. The system of claim 1, wherein the controller is programmed to compare if an instantaneous discharging energy released from the pair of electrodes of the first electrochemical desalination device meets an instantaneous energy requirement for charging the pair of electrodes of the second electrochemical desalination device, at the normal discharging mode of operation.

9. The system of claim 1, wherein the controller is programmed to determine the normal charging time and compulsory discharging time such that a difference between energy released and an energy input during the discharging time is maximized.

10. The system of claim 1, wherein the controller is programmed to repeat the calculating and determining the normal discharging time and compulsory discharging time at a certain time interval.

11. The system of claim 1, wherein the controller is programmed to control the system such that at the end of the compulsory discharging mode of operation, a voltage across the at least one pair of electrodes of the electrochemical desalination device in the discharging mode is substantially equal to zero, and a voltage across the electrochemical desalination device in the discharging mode is below zero.

* * * * *